US012636745B2

(12) United States Patent
Huang et al.

(10) Patent No.: US 12,636,745 B2
(45) Date of Patent: May 26, 2026

(54) NUMERICAL CONTROL MACHINE TOOL

(71) Applicant: SHENZHEN INSTITUTES OF ADVANCED TECHNOLOGY, CHINESE ACADEMY OF SCIENCES, Shenzhen (CN)

(72) Inventors: Bo Huang, Shenzhen (CN); Kai He, Shenzhen (CN); Gang Zhao, Shenzhen (CN); Qingping Xu, Shenzhen (CN); Juntai Zhang, Shenzhen (CN)

(73) Assignee: SHENZHEN INSTITUTES OF ADVANCED TECHNOLOGY, CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 19/086,164

(22) Filed: Mar. 21, 2025

(65) Prior Publication Data

US 2025/0353124 A1 Nov. 20, 2025

Related U.S. Application Data

(63) Continuation of application No. PCT/CN2022/120371, filed on Sep. 21, 2022.

(51) Int. Cl.
*B23P 23/02* (2006.01)
*B23Q 3/06* (2006.01)
*B23Q 5/10* (2006.01)

(52) U.S. Cl.
CPC ................ *B23P 23/02* (2013.01); *B23Q 3/06* (2013.01); *B23Q 5/10* (2013.01)

(58) Field of Classification Search
CPC .. B23P 23/02; B23Q 3/06; B23Q 5/10; B23Q 7/04; B23Q 2039/008; B23Q 39/00
See application file for complete search history.

(56) References Cited

FOREIGN PATENT DOCUMENTS

| | | | | | |
|---|---|---|---|---|---|
| CN | 203636358 U | * | 6/2014 | | |
| CN | 203726133 U | * | 7/2014 | | |
| CN | 204221369 U | * | 3/2015 | | |
| CN | 104827305 A | * | 8/2015 | ............. | B23Q 5/406 |
| CN | 107617916 A | * | 1/2018 | | |
| CN | 208083941 U | * | 11/2018 | | |
| CN | 110948240 A | * | 4/2020 | ........... | B23Q 37/002 |
| CN | 114670021 A | * | 6/2022 | ............... | B23Q 5/28 |
| EP | 1700653 A1 | * | 9/2006 | ............. | B23B 3/065 |

(Continued)

OTHER PUBLICATIONS

Chinese Second Office Action, Chinese Application No. 202211161494. 2, mailed Jun. 11, 2025 (16 pages).

(Continued)

*Primary Examiner* — Bayan Salone

(57) ABSTRACT

A numerical control machine tool includes: a base; a movable shaft assembly, which is arranged on the base; a rotary shaft assembly, which is arranged on the base, wherein a portion of a structure of the rotary shaft assembly is configured to move under the action of a portion of a structure of the movable shaft assembly, thereby performing turn-milling compound machining on a part; and a clamping assembly, which is arranged on the base and is used for clamping and fixing the part. The clamping assembly includes a first fixing member, a mounting member, a driving member and a flipping member.

12 Claims, 6 Drawing Sheets

(56)     References Cited

FOREIGN PATENT DOCUMENTS

WO      WO-2016106679  A1  *   7/2016   ............. B23Q 3/155

OTHER PUBLICATIONS

Chinese Rejection Decision, Chinese Application No. 202211161494.
2, mailed Aug. 6, 2025 (13 pages).
International Search Report and Written Opinion, International
Application No. PCT/CN2022/120371, mailed Dec. 14, 2022 (18
pages).
Chinese First Office Action,Chinese Application No. 202211161494.
2, mailed Jan. 20, 2025 (19 pages).

* cited by examiner

301

3013

401

3012

3011

403

404

402

4023 4045 4041 4043

4021

4024

4031 4032

4022 4044 4042

500

503

502

501

505

504

NUMERICAL CONTROL MACHINE TOOL

CROSS REFERENCE TO RELATED APPLICATIONS

This application is a continuation of International Patent Application No. PCT/CN2022/120371, filed Sep. 21, 2022, which is herein incorporated by reference in its entirety.

TECHNICAL FIELD

The present disclosure relates to the field of machine tools, in particular to a numerical control machine tool.

BACKGROUND

There is a demand for processing small parts in fields such as medical devices, jewelry, watches, aerospace, etc. For medium-end products and low-end products in these fields, they may have a medium requirement for processing preci- sion. The main requirements may be that, the manufacturing equipment has a low manufacturing cost and a high pro- cessing efficiency, and may automatically complete all pro- cessing procedures of the parts within one cycle. The manufacturing equipment for the medium-end products and low-end products may need to have a requirement of low manufacturing cost. Therefore, the structural scheme thereof may adopt a desktop type, which is small and easy to carry. Main parts and components of a machine tool may need to be entirely installed on the platform desktop, including a spindle (or a main shaft), a movable shaft, a rotary shaft, a tool magazine, or the like. For a part to be processed on both faces, considering the need for automation of the entire processing, a structure capable of flipping the part may need to be designed. Due to multi-process characteristics of the part, the designed numerical control machine tool for implants may need to install a milling spindle and a turning spindle simultaneously, so as to perform processing of different processes respectively.

At present, the design of multi-axis numerical control machine tool may mainly focus on five-axis and large ones. The five-axis numerical control machine tool may finish curved-surface processing very well, but only for single- faced processing. For double-faced processing, the five-axis numerical control machine tool may not finish all processing in a single clamping. Therefore, for specific parts, the five-axis numerical control machine tool may show insuf- ficient functionality and low processing efficiency. Large machine tools may have good rigidity and high product processing accuracy. However, they may be large in size, not easy to move, and may have high manufacturing costs. For the processing of the medium-end products and the low-end products, the large machine tools may not be very suitable.

SUMMARY

According to a first aspect of the present disclosure, a numerical control machine tool is provided. The numerical control machine tool may be configured to perform com- bined turning and milling processing of a part, so as to meet the multi-process machining demand of small parts. The numerical control machine tool may flip the part through a clamping assembly for double-faced processing. The present numerical control machine tool may include: a base; a movable shaft assembly, arranged on the base; a rotary shaft assembly, arranged on the base, wherein a portion of a structure of the rotary shaft assembly is configured to move under an action of a portion of a structure of the movable shaft assembly, so as to perform combined turning and milling processing of a part; and a clamping assembly, arranged on the base, and configured to clamp and fix the part. The clamping assembly may include a first fixing member, a mounting member, a driving member, and a flipping member. The first fixing member may be arranged on the rotary shaft assembly. The first fixing member may be configured to fix the part. The mounting member may be arranged on the movable shaft assembly. The flipping mem- ber may be rotatably arranged within the mounting member. The driving member may be arranged on one side of the mounting member. The flipping member may be configured to rotate under an action of the driving member, so as to fix and flip the part.

BRIEF DESCRIPTION OF THE DRAWINGS

In order to more clearly illustrate technical solutions of the present disclosure or related art, the drawings required in the description of the embodiments or the related art may be briefly introduced below. Obviously, the drawings in the following description are only some embodiments of the present disclosure. For those of ordinary skills in the art, other drawings may be obtained based on these drawings without creative efforts.

DETAILED DESCRIPTION

Technical solutions in embodiments of the present dis- closure will be described clearly and thoroughly in connec- tion with accompanying drawing of the embodiments of the present disclosure. Obviously, the described embodiments are only a part of the embodiments, but not all of them. All other embodiments by a person of ordinary skills in the art based on embodiments of the present disclosure without creative efforts shall all fall within the protection scope of the present disclosure.

In addition, the terms "first" and "second" etc., in the specification are only for the purpose of description, and should not be construed as indicating or implying relative importance or implicitly indicating the number of technical features referred to. Thus, the features preceded by "first" and "second" may explicitly or implicitly include one or more of these features.

The terms in the present specification may be used to illustrate the embodiments of the present disclosure, but may be not intended to limit the present disclosure. Unless otherwise definitely specified and limited, the terms "set", "joined", "connected" should be understood in a broad sense, for example, they may be fixed connections or detachable connections, or integrally connected. In some embodiments, they may be mechanical connections or electrical connections. In some embodiments, they may be direct connections or indirect connections through intermediate mediums, and they may be an internal communication between two components. For those of ordinary skills in the art, the specific meanings of the above-mentioned terms in the present disclosure may be understood according to specific circumstances.

Figure 1:
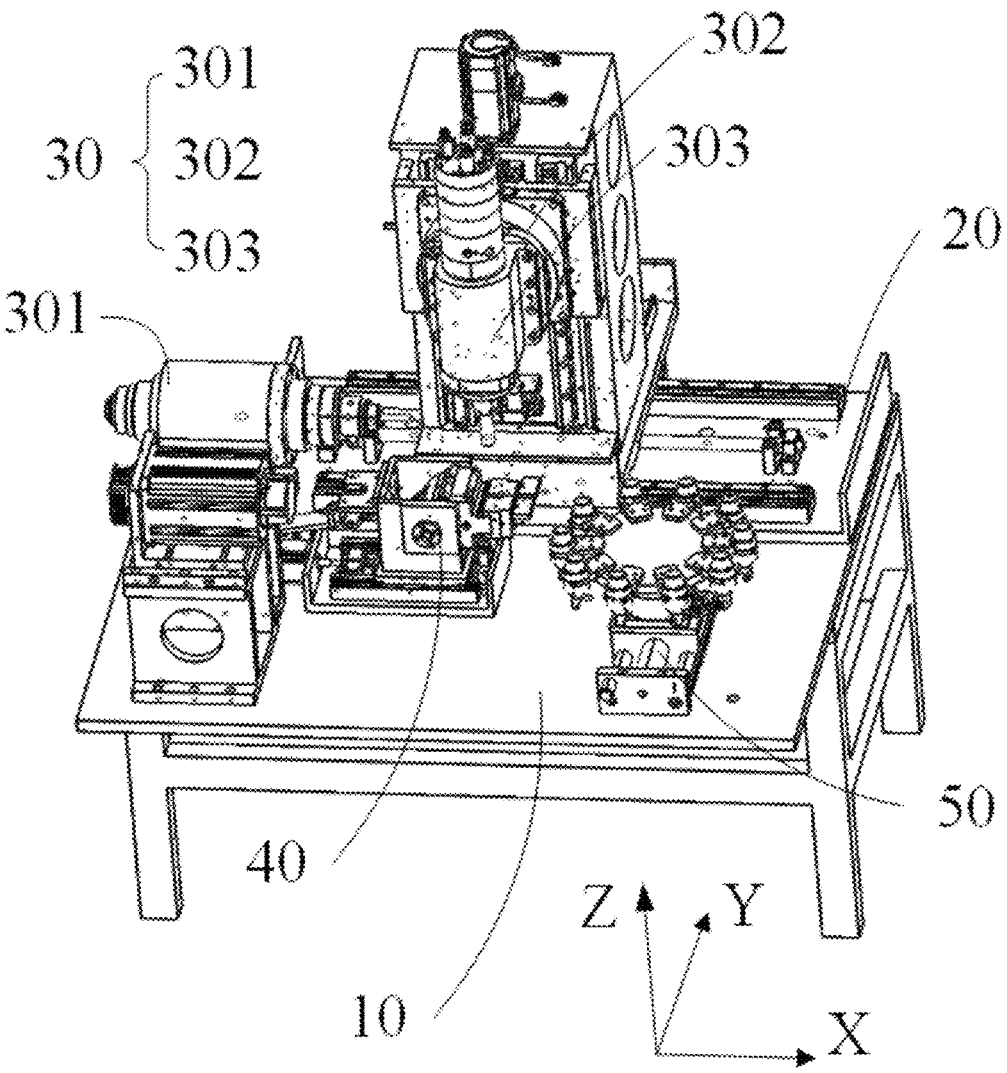
FIG. 1 is a structural diagram of an overall assembly of an embodiment of a numerical control machine tool according to the present disclosure.

As illustrated in FIG. 1, FIG. 1 is a structural diagram of an overall assembly of an embodiment of a numerical control machine tool according to the present disclosure. A numerical control machine tool 100 may be provided in the present disclosure. The numerical control machine tool 100 may include a base 10, a movable shaft assembly 20, a rotary shaft assembly 30 and a clamping assembly 40. The movable shaft assembly 20 may be arranged on the base 10. The rotary shaft assembly 30 may be arranged on the base 10, and configured to perform combined turning and milling processing of a part. The clamping assembly 40 may be arranged on the base 10, and configured to clamp and fix the part. A portion of the structure of the rotary shaft assembly 30 may be configured to move under the action of a portion of the structure of the movable shaft assembly 20.

The user may fix the part on the rotary shaft assembly 30 through the clamping assembly 40. The rotary shaft assembly 30 may drive a cutting tool on it to rotate. At the same time, the movable shaft assembly 20 may drive the rotary shaft assembly 30 and the clamping assembly 40 to move to an appropriate position. At this appropriate position, the cutting tool may perform turning processing or milling processing of the part, thereby processing the part into a predetermined shape.

Figure 2:
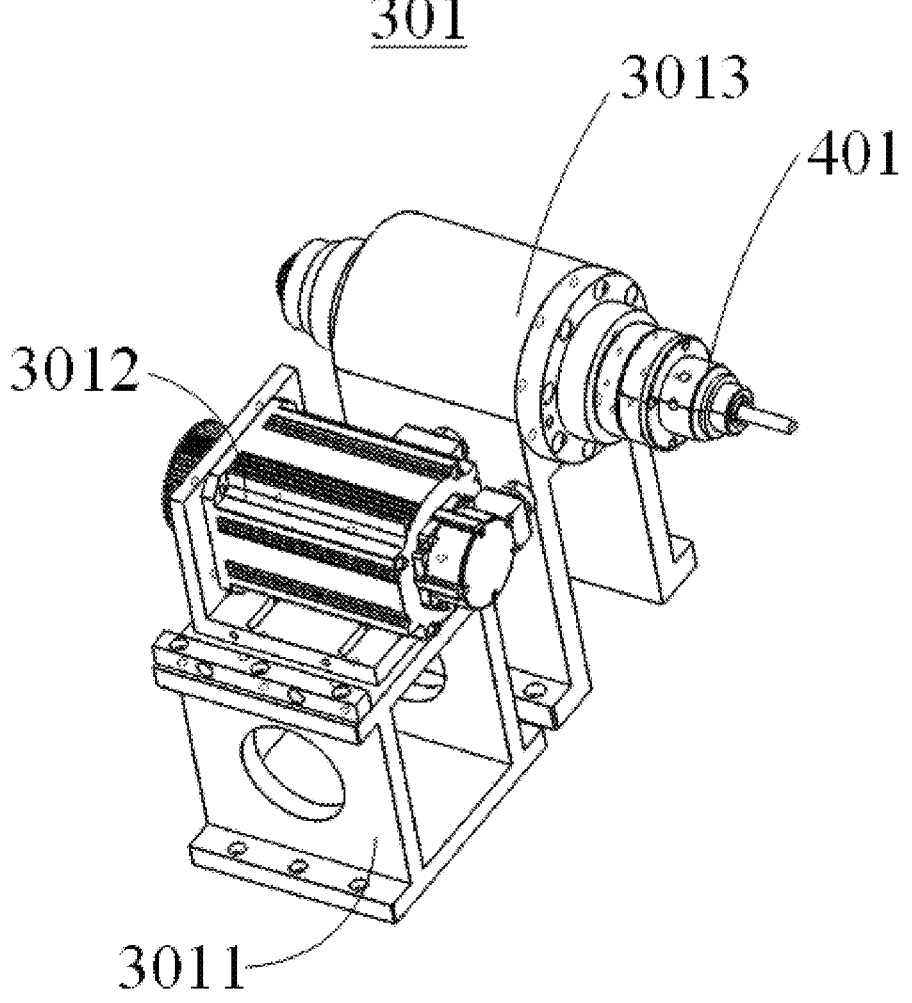
FIG. 2 is a structural diagram of an embodiment of a first spindle assembly of a numerical control machine tool according to the present disclosure.
Figure 3:
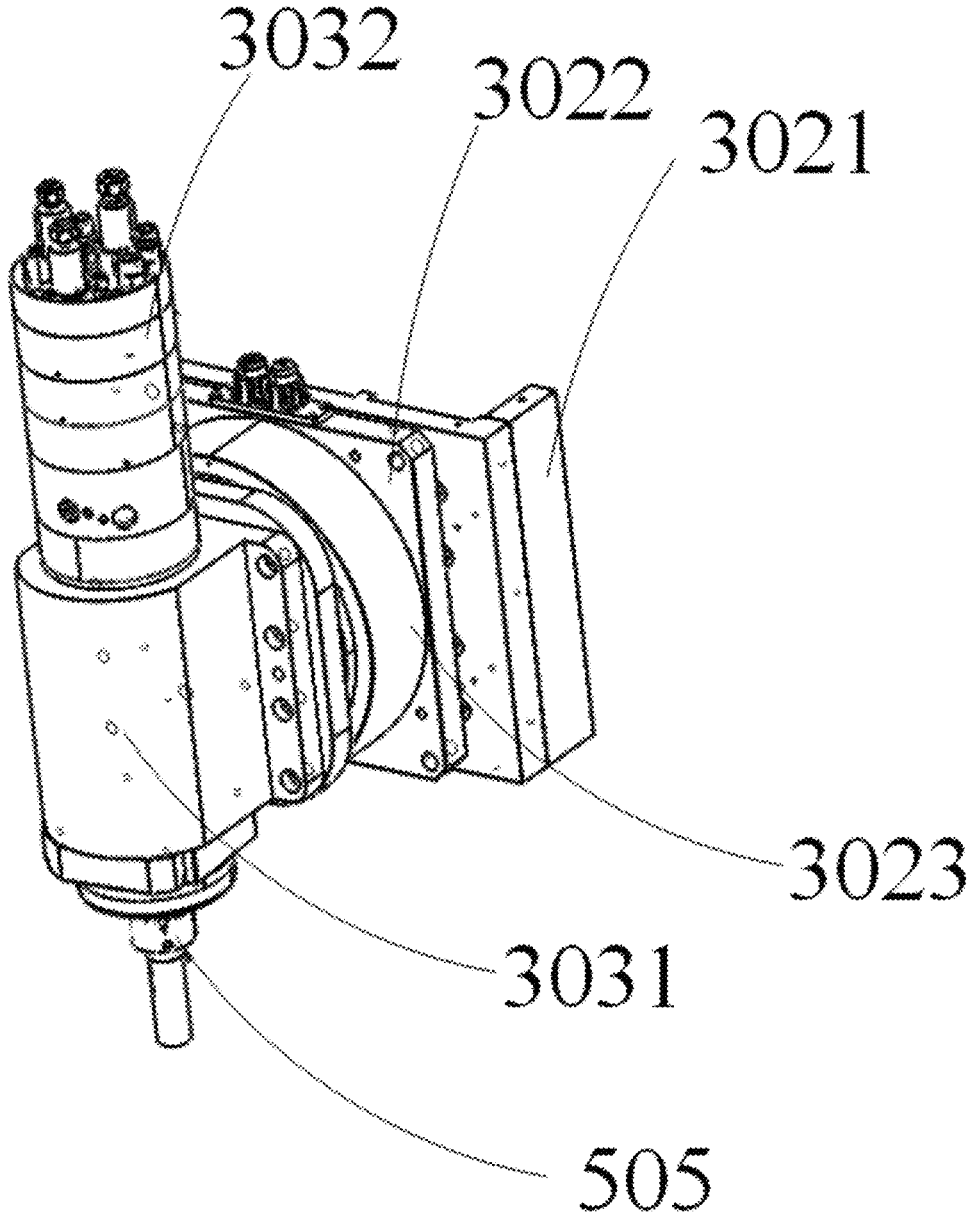
FIG. 3 is a structural diagram of an embodiment of a second spindle assembly and a third spindle assembly of a numerical control machine tool according to the present disclosure.

As illustrated in FIG. 2 and FIG. 3, FIG. 2 is a structural diagram of an embodiment of a first spindle assembly of the numerical control machine tool according to the present disclosure, and FIG. 3 is a structural diagram of an embodiment of a second spindle assembly and a third spindle assembly of the numerical control machine tool according to the present disclosure. The rotary shaft assembly 30 may include a first spindle assembly 301, a second spindle assembly 302, and a third spindle assembly 303. The first spindle assembly 301 may be arranged on the base 10 and configured to perform the turning processing. The second spindle assembly 302 may be slidably arranged on the movable shaft assembly 20. The third spindle assembly 303 may be arranged on the second spindle assembly 302 and configured to perform the milling processing. The third spindle assembly 303 may swing under the action of the second spindle assembly 302. The second spindle assembly 302 and the third spindle assembly 303 may move under the action of the movable shaft assembly 20.

Figure 4:
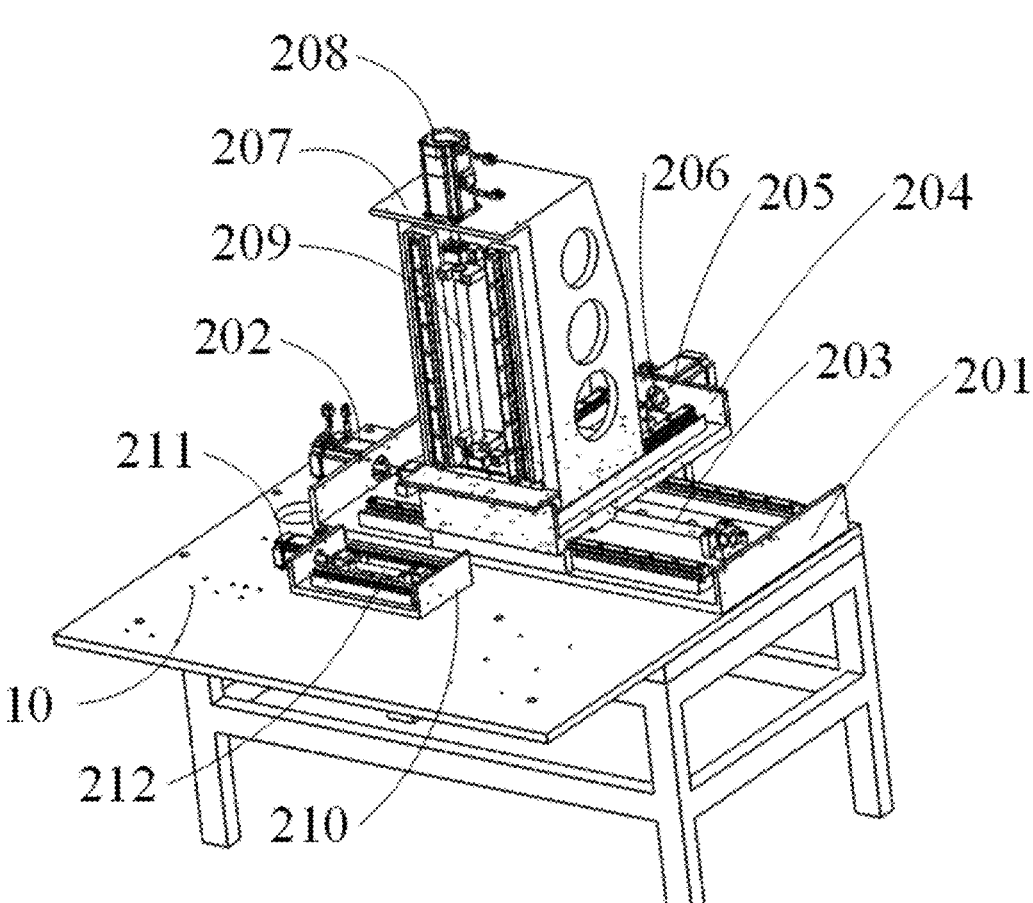
FIG. 4 is a structural diagram of an embodiment of a movable shaft assembly of a numerical control machine tool according to the present disclosure

As illustrated in FIG. 4, FIG. 4 is a structural diagram of an embodiment of a movable shaft assembly of the numerical control machine tool according to the present disclosure. The movable shaft assembly 20 may include an X-axis guide rail 201, a first electrical machinery 202, an X-axis lead screw 203, a Y-axis guide rail 204, a second electrical machinery 205, a Y-axis lead screw 206, a Z-axis guide rail 207, a third electrical machinery 208 and a Z-axis lead screw 209. The first electrical machinery 202 may be arranged on the X-axis guide rail 201. The X-axis lead screw 203 may be arranged on the X-axis guide rail 201. The X-axis lead screw 203 may be connected to an output end of the first electrical machinery 202. The Y-axis guide rail 204 may be arranged on the X-axis lead screw 203. The second electrical machinery 205 may be arranged on the Y-axis guide rail 204. The Y-axis lead screw 206 may be arranged on the Y-axis guide rail 204. The Y-axis lead screw 206 may be connected to an output end of the second electrical machinery 205. The Z-axis guide rail 207 may be arranged on the Y-axis lead screw 206. The third electrical machinery 208 may be arranged on the Z-axis guide rail 207. The Z-axis lead screw 209 may be arranged on the Z-axis guide rail 207. The Z-axis lead screw 209 may be connected to an output end of the third electrical machinery 208. Any two of the X axis, the Y axis and the Z axis may be perpendicular to each other. The second spindle assembly 302 may be configured to be connected to the Z-axis lead screw 209.

When it is necessary for the second spindle assembly 302 and the third spindle assembly 303 to move in the X-axis direction, the first electrical machinery 202 may be started. The output end of the first electrical machinery 202 may drive the X-axis lead screw 203 to rotate continuously, so that the Y-axis guide rail 204 may be enabled to move in the X direction. In a case where the first electrical machinery 202 drives the X-axis lead screw 203 to rotate forward, the Y-axis guide rail 204 may move to the left in the X direction. In a case where the first electrical machinery 202 drives the X-axis lead screw 203 to rotate in reverse, the Y-axis guide rail 204 may move to the right in the X direction.

When it is necessary for the second spindle assembly 302 and the third spindle assembly 303 to move in the Y direction, the second electrical machinery 205 may be started. The output end of the second electrical machinery 205 may drive the Y-axis lead screw 206 to rotate continuously, so that the Z-axis guide rail 207 may be enabled to move in the Y direction, and so that the Z-axis guide rail 207 may be enabled to move in the Y direction. In a case where the second electrical machinery 205 drives the Y-axis lead screw 206 to rotate forward, the Z-axis guide rail 207 may move forward in the Y direction. In a case where the second electrical machinery 205 drives the Y-axis lead screw 206 to rotate in reverse, the Z-axis guide rail 207 may move backward in the Y direction.

When it is necessary for the second spindle assembly 302 and the third spindle assembly 303 to move in the Z direction, the third electrical machinery 208 may be started. The output end of the third electrical machinery 208 may drive the Z-axis lead screw 209 to rotate continuously, so that the second spindle assembly 302 may be enabled to move in the Z direction, and so that the second spindle assembly 302 may be enabled to move in the Z direction. In a case where the third electrical machinery 208 drives the Z-axis lead screw 209 to rotate forward, the second spindle assembly 302 may move upward in the Z direction. In a case where the third electrical machinery 208 drives the Z-axis lead screw 209 to rotate in reverse, the second spindle assembly 302 may move downward in the Z direction.

In this way, by controlling the start and stop of the first electrical machinery 202, the second electrical machinery 205 and the third electrical machinery 208, the user may control the second spindle assembly 302 and the third spindle assembly 303 to move arbitrarily in the three directions including the X, Y and Z directions.

As is further illustrated in FIG. 4, the movable shaft assembly 20 may further include a first guide rail 210, a fourth electrical machinery 211 and a first lead screw 212. The first guide rail 210 may be arranged on a surface of the base 10. The fourth electrical machinery 211 may be arranged on the first guide rail 210. The first lead screw 212 may be arranged on the first guide rail 210. The first lead screw 212 may be connected to an output end of the fourth electrical machinery 211.

When performing milling processing of the part, it is necessary to re-fix and flip (or turn over) the part through the clamping assembly 40. Before the clamping assembly 40 flips the part, the entire clamping assembly 40 may need to be moved to a position of the first spindle assembly 301. At this time, the fourth electrical machinery 211 may be started. The output end of the fourth electrical machinery 211 may drive the first lead screw 212 to rotate continuously, so that the clamping assembly 40 may be driven to move in the X direction. In a case where the fourth electrical machinery 211 drives the first lead screw 212 to rotate forward, the clamping assembly 40 may move to the left in the X direction. In a case where the fourth electrical machinery 211 drives the first lead screw 212 to rotate in reverse, the clamping assembly 40 may move to the right in the X direction.

As is further illustrated in FIG. 2, the first spindle assembly 301 may include a first support 3011, a fifth electrical machinery 3012 and a turning spindle 3013. The first support 3011 may be arranged on the base 10. The fifth electrical machinery 3012 may be arranged on the first support 3011. The turning spindle 3013 may be rotatably arranged on one side of the base 10 and connected to an output end of the fifth electrical machinery 3012 via a belt assembly. The turning spindle 3013 may be a mechanical spindle, and is configured to fix the part and drive the part to rotate continuously.

When performing turning processing of the part, the user may fix the part on the clamping assembly 40, and then start the fifth electrical machinery 3012. The output end of the fifth electrical machinery 3012 may drive the turning spindle 3013 to rotate through the belt assembly, thereby driving the part to rotate continuously. At this point, the cutting tool on the third spindle assembly 303 may move arbitrarily in the X, Y or Z directions under the action of the movable shaft assembly 20. When the cutting tool moves to an edge of the part, the cutting tool may continue to move and perform the turning processing of the part. The turning processing may refer that, the part continuously rotates together with the turning spindle 3013, while the cutting tool may perform a linear or curvilinear translational motion, thereby gradually approaching the part for processing.

As is further illustrated in FIG. 3, the second spindle assembly 302 may include a slide plate 3021, a connecting plate 3022 and a first motor 3023. The slide plate 3021 may be arranged on the Z-axis guide rail 207 and capable of sliding in the Z axis on the Z-axis guide rail 207. The connecting plate 3022 may be arranged on one side of the slide plate 3021 away from the Z-axis guide rail 207. The first motor 3023 may be arranged on one side of the connecting plate 3022 away from the Z-axis guide rail 207. The first motor 3023 may be configured to drive the third spindle assembly 303 to swing.

The third spindle assembly 303 may not only move arbitrarily in the X, Y or Z direction under the action of the movable shaft assembly 20, but may also swing on the XZ plane under the action of the second spindle assembly 302, so that the cutting tool may swing accordingly. The first motor 3023 may a large drive motor with a compact structure. The first motor 3023 may bear the weight of the third spindle assembly 303 and may maintain positioning accuracy very well under a load.

The third spindle assembly 303 may include a second support 3031 and a milling spindle 3032. The second support 3031 may be arranged on the output end of the first motor 3023. The milling spindle 3032 may be arranged on the second support 3031 and perform the milling processing of the parts. The milling spindle 3032 may adopt an electric spindle, which may have the advantages of compact structure, high processing accuracy and high rotational speed. The milling spindle 3032 may be configured to perform milling, drilling processing, threading processing and cutting processing, or the like.

During the milling processing, generally after a first face of the part is machined by turning, the clamping assembly 40 may move to the vicinity of the part and clamp the part. At this point, the cutting tool may cut off the part. After that, the part would be flipped by a certain angle under the action of the clamping assembly 40. Since the milling spindle 3032 is the electric spindle, it may rotate by itself. Under the action of the movable shaft assembly 20, the milling spindle 3032 may move in the X, Y or Z direction. Under the action of the first motor 3023, the milling spindle 3032 may swing on the XZ plane. In this way, in a case where the milling spindle 3032 is continuously rotating and thus driving the cutting tool to rotate continuously, the cutting tool may perform secondary processing of the second face of the part. The milling processing may refer to a case where, it is ensured that the part remains stationary, while the cutting tool continuously moves and rotates.

Figure 5:
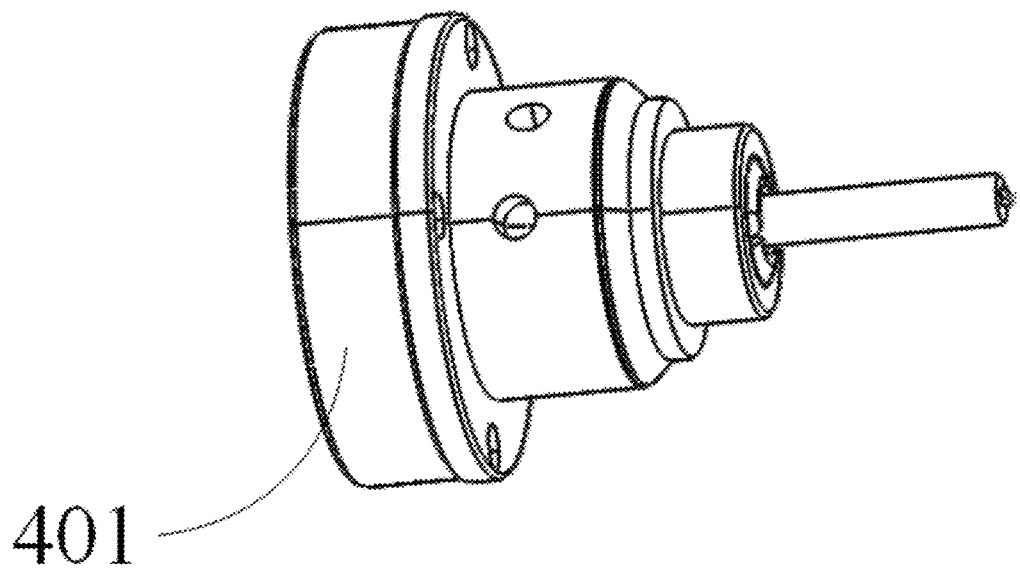
FIG. 5 is a structural diagram of an embodiment of a first fixing member of a numerical control machine tool accord- ing to the present disclosure.
Figure 6:
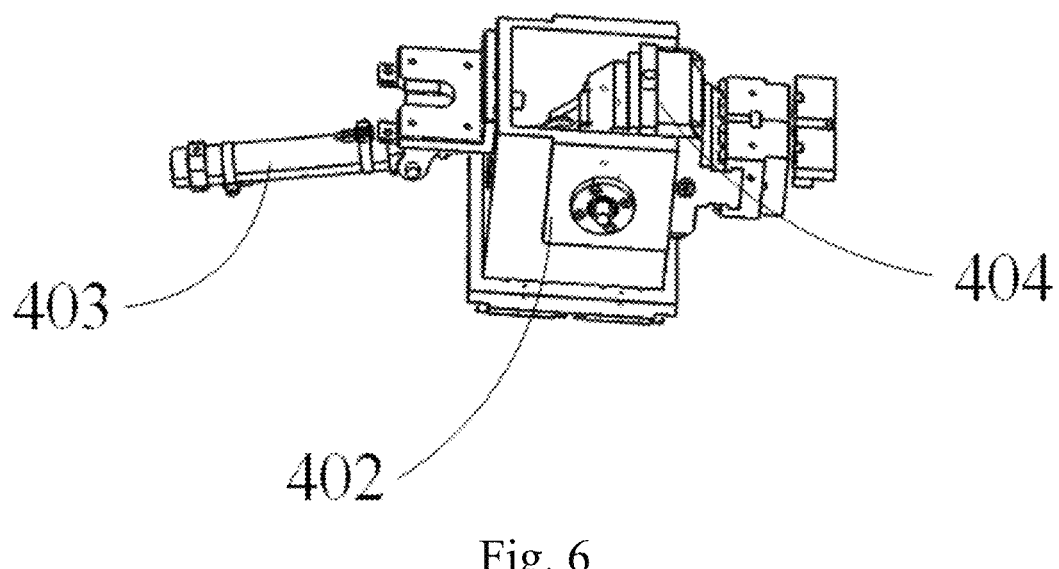
FIG. 6 is a structural diagram of an embodiment of a clamping assembly of a numerical control machine tool according to the present disclosure.
Figure 7:
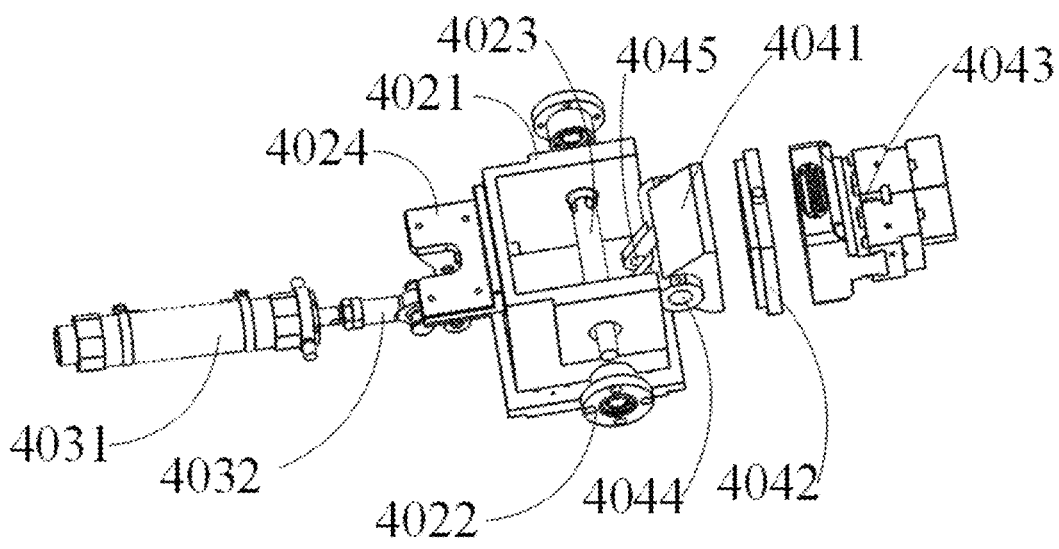
FIG. 7 is an exploded view of an embodiment of a clamping assembly of a numerical control machine tool according to the present disclosure.

Please refer to FIG. 5, FIG. 6 and FIG. 7, FIG. 5 is a structural diagram of an embodiment of a first fixing member of a numerical control machine tool according to the present disclosure, FIG. 6 is a structural diagram of an embodiment of a clamping assembly of a numerical control machine tool according to the present disclosure, and FIG. 7 is an exploded view of an embodiment of a clamping assembly of a numerical control machine tool according to the present disclosure. The clamping assembly 40 may include a first fixing member 401, a mounting member 402, a driving member 403, and a flipping member 404. The first fixing member 401 may be arranged on the turning spindle 3013. The first fixing member 401 may be configured to fix the part. The mounting member 402 may be arranged on the first lead screw 212. The flipping member 404 may be rotatably arranged within the mounting member 402. The driving member 403 may be arranged on one side of the mounting member 402. The flipping member 404 may be configured to rotate under the action of the driving member 403, so as to fix and flip the part.

The clamping assembly 40 may include two portions. The first portion of the two portions may be the first fixing member 401. The first fixing member 401 may be a tube collet, or may be a chuck, a spring collet, an indexing head or other suitable clamping device. When the part is fixed in the first fixing member 401, the turning processing may be performed at this point. When the part is fixed in the flipping member 404, the milling processing may be performed at this point.

Specifically, during the turning processing, the part may be fixed to the first fixing member 401, During the milling processing, the flipping member 404 may flip to an end of the part and fix the part. The cutting tool may subsequently cut off the part, and then the flipping member 404 may drive the part to rotate to the appropriate position for the milling processing.

The mounting member 402 may include a fixing seat 4021, bearings 4022, flipping shaft 4023, and a mounting seat 4024. The fixing seat 4021 may be arranged on the rotary shaft assembly 30. The bearings 4022 may be arranged on both sides of the fixing seat 4021. The flipping shaft 4023 may be arranged between the bearings 4022. The mounting seat 4024 may be arranged on an outer wall of the fixing seat 4021, and may be configured to mount the driving member 403. The first lead screw 212 may be connected to the fixing seat 4021.

Specifically, the fixing seat 4021 may substantially be a cuboid. Of course, the fixing seat 4021 may also be in other shapes, such as a cube, a triangular body, or the like. The fixing seat 4021 may be hollow inside. The flipping shaft 4023 may be located inside the fixing seat 4021. The fixing seat 4021 may be formed of metal (e.g., stainless steel, aluminum, or the like), plastic, fiber composite material or other suitable materials or combinations thereof. The bearings 4022 may be arranged on both sides of the fixing seat 4021 by means of interference connections. The bearings 4022 may be roller bearings 4022 or ball bearings 4022. The function of the flipping shaft 4023 may be to assist the flipping member 404 to perform rotating.

The flipping member 404 may include a flipping seat 4041, a cushion block 4042 and a second fixing member 4043. The flipping seat 4041 may be sleeved on the outside of the flipping shaft 4023. The cushion block 4042 may be arranged on one side of the flipping seat 4041. The second fixing member 4043 may be arranged on one side of the cushion block 4042 and may be configured to clamp the part. The bottom of the flipping seat 4041 may define a first through-hole 4044. The flipping seat 4041 may be sleeved on the outside of the flipping shaft 4023 through the first through-hole 4044. The flipping seat 4041 and the flipping shaft 4023 may be in interference fit. The bottom of the flipping seat 4041 may define two second through-holes 4045 for cooperating with the driving member 403, such that the driving member 403 may drive the flipping seat 4041 and the second fixing member 4043 to rotate. The second fixing member 4043 may be a pneumatic vise, and may be configured to clamp and fix the part after flipping.

The driving member 403 may include a flipping cylinder 4031 and a connecting rod 4032. The flipping cylinder 4031 may be fixed to the mounting seat 4024. The connecting rod 4032 may be connected to an end of a piston rod of the flipping cylinder 4031, and may be rotatably connected to the flipping seat 4041. The connecting rod 4032 may include a main body of the connecting rod 4032 and a rotating pin. The rotating pin may be arranged at an end of the main body of the connecting rod 4032 away from the flipping cylinder 4031. The rotating pin may be arranged within the first through-hole 4044.

In a case where the piston rod of the flipping cylinder 4031 extends, the piston rod may push the connecting rod 4032 to move in the direction towards the fixing seat 4021. Since the connecting rod 4032 is connected to the bottom of the flipping seat 4041, the connecting rod 4032 may drive the flipping seat 4041, the cushion block 4042 and the second fixing member 4043 to rotate counterclockwise. In a case where the piston rod of the flipping cylinder 4031 retracts, the piston rod may drive the connecting rod 4032 to move in the direction away from the fixing seat 4021, the connecting rod 4032 may drive the flipping seat 4041, the cushion block 4042 and the second fixing member 4043 to rotate clockwise.

Figure 8:
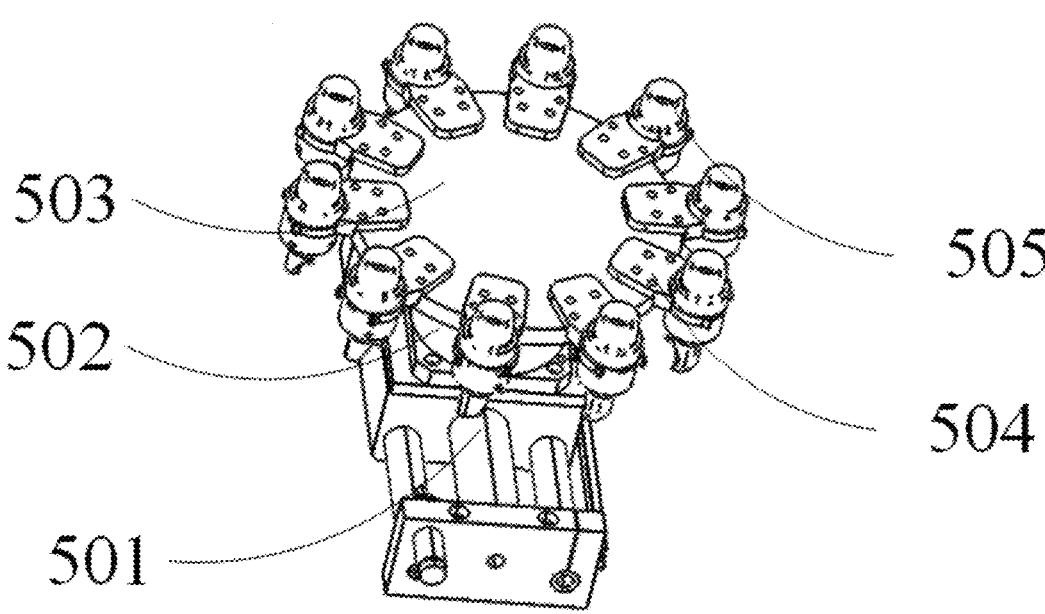
FIG. 8 is a structural diagram of an embodiment of a tool magazine assembly of a numerical control machine tool according to the present disclosure.

As illustrated in FIG. 8, FIG. 8 is a structural diagram of an embodiment of a tool magazine assembly of a numerical control machine tool according to the present disclosure. The numerical control machine tool 100 may further include a tool magazine assembly 50. The tool magazine assembly 50 may be arranged on the base 10. The tool magazine assembly 50 may be configured to change cutting tools of the rotary shaft assembly 30. The tool magazine assembly 50 may include a rodless cylinder 501, a second motor 502, a support plate 503, several tool holders 504 and a tool shank 505. The rodless cylinder 501 may be arranged on the base 10. The second motor 502 may be arranged at an output end of the rodless cylinder 501. The several tool holders 504 may be arranged on the support plate 503. The tool shank 505 may be arranged inside the tool holder 504 and may be provided with different types of cutting tools.

The rodless cylinder 501 may provide moveable function of the tool magazine assembly 50. When no cutting tool is required to be changed, the second motor 502, the support plate 503, the tool holders 504, the tool shank 505 and the cutting tools may be located away from the X-axis guide rail 201. When the cutting tool is required to be changed, the rodless cylinder 501 may push the second motor 502 and the components thereon to move closer to the position of the X-axis guide rail 201, to facilitate cutting tool changing of the milling spindle 3032. After the cutting tool changing is completed, the rodless cylinder 501 may retract and drive the second motor 502 and the components thereon to return to the original position, thereby preventing interference with the machining movement of the milling spindle 3032.

The present disclosure may adopt a seven-axis structure scheme including three rotating axes and four moving axes. In this way, a complete process of machining processing of a single part may be more conveniently realized. The complete processing of the small complex part may be completed in one single processing cycle. In comparation with the existing five-axis machine tools, the present seven-axis structure scheme may have a high degree of automation, improve the production efficiency, and be more conducive to mass production. In the rotary shaft assembly 30, the combination of the turning spindle 3013 and the milling spindle 3032 may realize the compound machining function of turning and milling to support the multi-process machining. The movable shaft assembly 20, the rotary shaft assembly 30, the clamping assembly 40 and the tool magazine assembly 50 may be all deployed on the base 10. The structure may be compact, convenient to move and have a low manufacturing cost.

In the description of the present disclosure, the description with reference to the terms "an embodiment", "another embodiment" etc. may mean that, the specific features, structures, materials, or features described in conjunction with the embodiment or the example may be included in at least one embodiment or example of the present disclosure. In the present specification, schematic expressions of the above-mentioned terms do not necessarily refer to the same embodiment or example. Moreover, the specific features, structures, materials or characteristics described may be combined in any of the one or more embodiments or examples in a suitable manner.

The above are only implementations of the present disclosure, and do not limit the patent scope of the present disclosure. Any equivalent changes to the structure or processes made by the description and drawings of the present disclosure or directly or indirectly used in other related technical field may be included in the protection scope of the present disclosure.

The invention claimed is:

1. A numerical control machine tool, comprising:
a base;
a movable shaft assembly, arranged on the base;
a rotary shaft assembly, arranged on the base, wherein a portion of a structure of the rotary shaft assembly is configured to move under an action of a portion of a structure of the movable shaft assembly, to perform combined turning and milling processing of a part; and
a clamping assembly, arranged on the base, and configured to clamp and fix the part;
wherein the clamping assembly comprises a first fixing member, a mounting member, a driving member, and a flipping member; the first fixing member is arranged on the rotary shaft assembly;
the first fixing member is configured to fix the part; the mounting member is arranged on the movable shaft assembly; the flipping member is rotatably arranged within the mounting member; the driving member is arranged on one side of the mounting member; the flipping member is configured to rotate under an action of the driving member, so as to fix and flip the part.

2. The numerical control machine tool as claimed in claim 1, wherein
the mounting member comprises a fixing seat, bearings, a flipping shaft and a mounting seat; the fixing seat is arranged on the movable shaft assembly; the bearings are arranged on both sides of the fixing seat; the flipping shaft is arranged between the bearings; the mounting seat is arranged on an outer wall of the fixing seat, and is configured to mount the driving member.

3. The numerical control machine tool as claimed in claim 2, wherein
the flipping member comprises a flipping seat, a cushion block and a second fixing member; the flipping seat is sleeved on an outside of the flipping shaft; the cushion block is arranged on one side of the flipping seat; the second fixing member is arranged on one side of the cushion block; the second fixing member is configured to clamp the part.

4. The numerical control machine tool as claimed in claim 3, wherein
the driving member comprises a flipping cylinder and a connecting rod; the flipping cylinder is fixed to the mounting seat; the connecting rod is connected to one end of a piston rod of the flipping cylinder; the connecting rod is rotatably connected to the flipping seat.

5. The numerical control machine tool as claimed in claim 1, wherein
the rotary shaft assembly comprises a first spindle assembly, a second spindle assembly and a third spindle assembly; the first spindle assembly is arranged on the base, and configured to perform turning processing; the second spindle assembly is slidably arranged on the movable shaft assembly; the third spindle assembly is arranged on the second spindle assembly, and configured to perform milling processing; the third spindle assembly is configured to swing under an action of the second spindle assembly; the second spindle assembly and the third spindle assembly are configured to move under an action of the movable shaft assembly.

6. The numerical control machine tool as claimed in claim 5, wherein the movable shaft assembly comprises: an X-axis guide rail, arranged on a surface of the base; a first electrical machinery, arranged on the X-axis guide rail; an X-axis lead screw, arranged on the X-axis guide rail and connected to an output end of the first electrical machinery; a Y-axis guide rail, arranged on the X-axis lead screw; a second electrical machinery, arranged on the Y-axis guide rail; a Y-axis lead screw, arranged on the Y-axis guide rail and connected to an output end of the second electrical machinery; a Z-axis guide rail, arranged on the Y-axis lead screw; a third electrical machinery arranged on the Z-axis guide rail; and a Z-axis lead screw, arranged on the Z-axis guide rail and connected to an output end of the third electrical machinery; wherein any two of X axis, Y axis and Z axis are perpendicular to each other, the second spindle assembly is connected to the Z-axis lead screw.

7. The numerical control machine tool as claimed in claim 6, wherein
the movable shaft assembly further comprises: a first guide rail; a fourth electrical machinery, arranged on the first guide rail; and a first lead screw, arranged on the first guide rail and connected to an output end of the fourth electrical machinery; wherein the first lead screw is connected to the fixing seat.

8. The numerical control machine tool as claimed in claim 5, wherein
the first spindle assembly comprises a first support, a fifth electrical machinery and a turning spindle; the first support is arranged on the base; the fifth electrical machinery is arranged on the first support; the turning spindle is rotatably arranged on one side of the base; an output end of the fifth electrical machinery is connected to the turning spindle via a belt assembly; the turning spindle is connected to the first fixing member.

9. The numerical control machine tool as claimed in claim 6, wherein
the second spindle assembly comprises a slide plate, a connecting plate and a first motor; the slide plate is arranged on the Z-axis guide rail; the slide plate is capable of sliding in Z axis along the Z-axis guide rail; the connecting plate is arranged on one side of the slide plate away from the Z-axis guide rail; the first motor is arranged on one side of the connecting plate away from the Z-axis guide rail; the first motor is configured to drive the third spindle assembly to swing.

10. The numerical control machine tool as claimed in claim 9, wherein
the third spindle assembly comprises a second support and a milling spindle; the second support is arranged on the output end of the first motor; the milling spindle is arranged on the second support.

11. The numerical control machine tool as claimed in claim 1, wherein
the numerical control machine tool further comprises a tool magazine assembly, the tool magazine assembly is arranged on the base, the tool magazine assembly is configured to change a cutting tool for the rotary shaft assembly.

12. The numerical control machine tool as claimed in claim 11, wherein
the tool magazine assembly comprises a rodless cylinder, a second motor, a support plate, a tool holder and a tool shank; the rodless cylinder is arranged on the base; the second motor is arranged on an output end of the rodless cylinder; an output end of the second motor is provided with the support plate, the support plate is provided with several tool holders, the tool shank is arranged within the tool holder, the cutting tool is arranged within the tool shank.

* * * * *